(12) United States Patent
Restivo

(10) Patent No.: US 12,130,836 B1
(45) Date of Patent: Oct. 29, 2024

(54) SYSTEMS AND METHODS FOR DATA RETENTION WHILE MIGRATING OBJECTS AND OBJECT METADATA STORED IN OBJECT STORAGE ENVIRONMENTS MIGRATED ACROSS CLOUD ECOSYSTEMS

(71) Applicant: Citibank, N.A., New York, NY (US)

(72) Inventor: Justin Restivo, Coppell, TX (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 18/478,454

(22) Filed: Sep. 29, 2023

(51) Int. Cl.
*G06F 16/27* (2019.01)
*G06F 16/2457* (2019.01)

(52) U.S. Cl.
CPC ........ *G06F 16/27* (2019.01); *G06F 16/24573* (2019.01)

(58) Field of Classification Search
CPC ... G06F 16/27; G06F 16/24573; G06F 16/254
See application file for complete search history.

(56) References Cited

U.S. PATENT DOCUMENTS

| | | | |
|---|---|---|---|
| 2008/0222192 A1* | 9/2008 | Hughes | G06F 16/258 707/999.102 |
| 2009/0106196 A1* | 4/2009 | Gutlapalli | G06F 16/2358 707/999.102 |
| 2019/0205429 A1* | 7/2019 | Lee | G06F 16/214 |
| 2019/0288915 A1* | 9/2019 | Denyer | G06F 16/252 |
| 2020/0401312 A1* | 12/2020 | Pyati | G06F 3/0604 |
| 2021/0279354 A1* | 9/2021 | Gandhi | G06F 11/3034 |
| 2021/0334246 A1* | 10/2021 | Seelemann, II | G06F 16/27 |
| 2021/0406234 A1* | 12/2021 | Mohen | G06F 16/00 |
| 2022/0116201 A1* | 4/2022 | Reddy | H04L 9/0643 |
| 2022/0179833 A1* | 6/2022 | Ramalingam | G06F 16/2237 |
| 2022/0308783 A1* | 9/2022 | Chinthekindi | G06F 3/0649 |
| 2022/0309046 A1* | 9/2022 | Qiu | G06F 11/1435 |

\* cited by examiner

*Primary Examiner* — Brittany N Allen
*Assistant Examiner* — William P Bartlett
(74) *Attorney, Agent, or Firm* — Foley & Lardner LLP

(57) ABSTRACT

Systems and methods for novel uses and/or improvements to data migration. In particular, systems and methods for data migration of metadata stored in object storage from one container to another, especially in instances when the metadata is destined for ingestion by an artificial intelligence application. The systems and methods ensure that all metadata (e.g., metadata stored in object storage) is preserved during data migration, including metadata such as content type, object lock mode, object lock retain until date, and/or custom metadata.

19 Claims, 7 Drawing Sheets

```
212
{
  "key": "600-600_hq.gif",
  "headers": {
    "AcceptRanges": "bytes",
    "LastModified": "2023-07-03T20:07:59+00:00",
    "ContentLength": 6284720,
    "ETag": "\"7b89ce26fa1fd9f617531766c2e2565a\"",
    "VersionId": "IT.pRyAAGwoChkX3StqXfCQxDr1irO1J",
    "ContentType": "image/gif",
    "ServerSideEncryption": "AES256",
    "Metadata": {
      "old-sha256": "5c90010edb021f47a6f1655ebf1c674cc15e085ec320a22faa76012165a0df35",
      "Custom_Metadata": "Value_1",
      "old-objectlockmode": "GOVERNANCE",
      "old-objectlockretainuntildate": "2023-07-03T19:55:05+00:00",
      "old-content-length": "6284720",
      "old-etag": "\"7b89ce26fa1fd9f617531766c2e2565a\"",
      "old-content-type": "image/gif",
      "old-key": "600-600_hq.gif",
      "old-lastmodified": "2023-07-03T17:26:01+00:00",
      "old-serversideencryption": "AES256",
    },
    "ObjectLockMode": "GOVERNANCE",
    "ObjectLockRetainUntilDate": "2023-07-04T20:07:58.228000+00:00"
Or
    "ObjectLockRetainUntilDate": "DEFAULT"
  }
}
```

Target Bucket

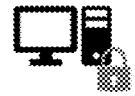

Preserved Source Data
Consistent Retention Data
Supplemental Staging Data

FIG. 2C

SYSTEMS AND METHODS FOR DATA RETENTION WHILE MIGRATING OBJECTS AND OBJECT METADATA STORED IN OBJECT STORAGE ENVIRONMENTS MIGRATED ACROSS CLOUD ECOSYSTEMS

BACKGROUND

Cloud computing is a technology and service model that involves the delivery of computing resources and services over the internet. Instead of owning and maintaining physical servers and data centers, organizations and individuals can access and use computing resources, including servers, storage, databases, networking, software, and more, on a pay-as-you-go or subscription basis from cloud service providers. These resources are hosted and managed in remote data centers operated by cloud providers. Cloud storage is a cloud computing service that provides a way to store and manage data in remote data centers over the internet. Instead of storing data on local or on-premises hardware, users and organizations can leverage cloud storage services provided by cloud service providers. Cloud storage offers several key advantages, including scalability, accessibility, redundancy, and cost-effectiveness. Typically, cloud storage is provided through the use of a container (e.g., an S3 bucket), which refers to a storage address location and space within a cloud storage service that utilizes the S3 protocol. When staying in the same cloud provider or ecosystem, migrating data from one container to another is generally straightforward and commonly performed for various reasons.

Data migration does, however, present challenges with migrating objects utilizing object storage. For example, in contrast to a file storage system (e.g., NFS), where files are stored in directories and subdirectories (e.g., folders), in object storage, files are stored as "objects" in a "flat" address space, almost as if the objects are in a single folder. In object storage, each object has a unique identifier and associated metadata, which enables object storage platforms to find the associated data quickly and easily. This metadata is critical to reference where these objects exist in the object storage platform. Moreover, maintaining the integrity of the metadata (e.g., during and after migration) is important as this metadata may be searched natively, is editable in-place, and may be easily ingested for artificial intelligence models, including, but not limited to, machine learning, deep learning, etc. (referred to collectively herein as artificial intelligence models, machine learning models, or simply models).

Despite this importance, metadata stored in object storage is susceptible to deletion and/or modification when attempting to migrate this data from one container to another. Furthermore, as container to container migration typically arises when migrating data from one cloud provider to another, cloud providers have an incentive to "lock-in" current users and leave this issue unaddressed. As such, the conventional standard for handling data migration is to "move and rebuild" this metadata. That is, data is migrated from one container to another despite the lost and/or modification of the metadata with the understanding that the data must be repaired after transfer.

SUMMARY

Systems and methods are described herein for novel uses and/or improvements to data migration. In particular, systems and methods are described herein for data migration of metadata stored in object storage from one container to another, especially in instances when the metadata is destined for ingestion by an artificial intelligence application. More specifically, the systems and methods ensure that all metadata (e.g., metadata stored in object storage) is preserved during data migration, including metadata such as content type, last modified date, creation date, object lock mode, object lock retain until date, and/or other custom metadata from one cloud-based container environment to another.

To overcome these technical deficiencies in conventional data migration systems, the systems and methods uses a novel object migration strategy that involves generating a supplemental data structure that is migrated with the object from a source location (e.g., a source bucket) to a target location (e.g., a target bucket). For example, in existing systems, metadata stored in object storage does not transfer. As such, this object-stored metadata for the object is lost. The systems and methods overcome this issue by generating supplemental data structure (e.g., an array representing the object-stored metadata). The supplemental data structure is then stored in a staging platform for the data migration and linked to the source location using an object identifier that is linked to an object header in the source location. The system then performs the data migration and changes the link in the object identifier from a first object header at the source location to a second object header at the target location as part of the same function as the data migration of the object. Through the use of the supplemental data structure and its transfer via the changing identifier, the object-stored metadata that was stored at the source location is now stored with the object at the target location. Furthermore, the data included in the supplemental data structure is not subject to data migration ingestion procedures at the target location and thus is preserved in its native form. Accordingly, object-stored metadata (e.g., last modified date) remains in its native form (e.g., reflecting the date the data was last modified at the source location) and is not changed based on the ingestion procedure at the target location (e.g., to reflect the date of the data migration).

Despite the use of the supplemental data structure and source identifier change, there is nonetheless a risk that some metadata may be modified. Moreover, even if the metadata is not modified, there is a need to validate that there was no modification. While a manual review could accomplish this, such a procedure is not practical. As such, the supplemental data structure further comprises a hash value of the array of data in the supplemental data structure. As the hash value is stored in the supplemental data structure, the has value is also linked to the object in the target location upon the source identifier change. As such, the system may validate the hash value to confirm that the metadata is not modified upon upload at the target source.

As a further benefit of the supplemental data structure, the system and methods may provide benefits beyond ensuring proper data retention during data migration. For example, the system may also add additional object-stored metadata that was not present at the source location. Such additional object-stored metadata may include additional retention rules for the data post-data migration.

In some aspects, systems and methods for data retention while migrating metadata stored in object storage of objects being migrated across container ecosystems are described. For example, the system may receive a first object, at a source location, for migration to a target location. The system may determine first object-stored metadata for the first object. The system may generate an array of the first object-stored metadata. The system may determine a first source identifier, wherein the first source identifier corresponds to the first object at the source location. The system may generate a first supplemental data structure comprising on the array and the first source identifier. The system may store the first supplemental data structure at a staging location. The system may execute a first function that causes the first object to be migrated from the source location to the target location and changes the first source identifier in the first supplemental data structure to a second source identifier, wherein the second source identifier corresponds to the first object at the target location.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIGS. 2A-C shows illustrative diagrams of metadata that is retained during migration, in accordance with one or more embodiments.

DETAILED DESCRIPTION OF THE DRAWINGS

Figure 1:
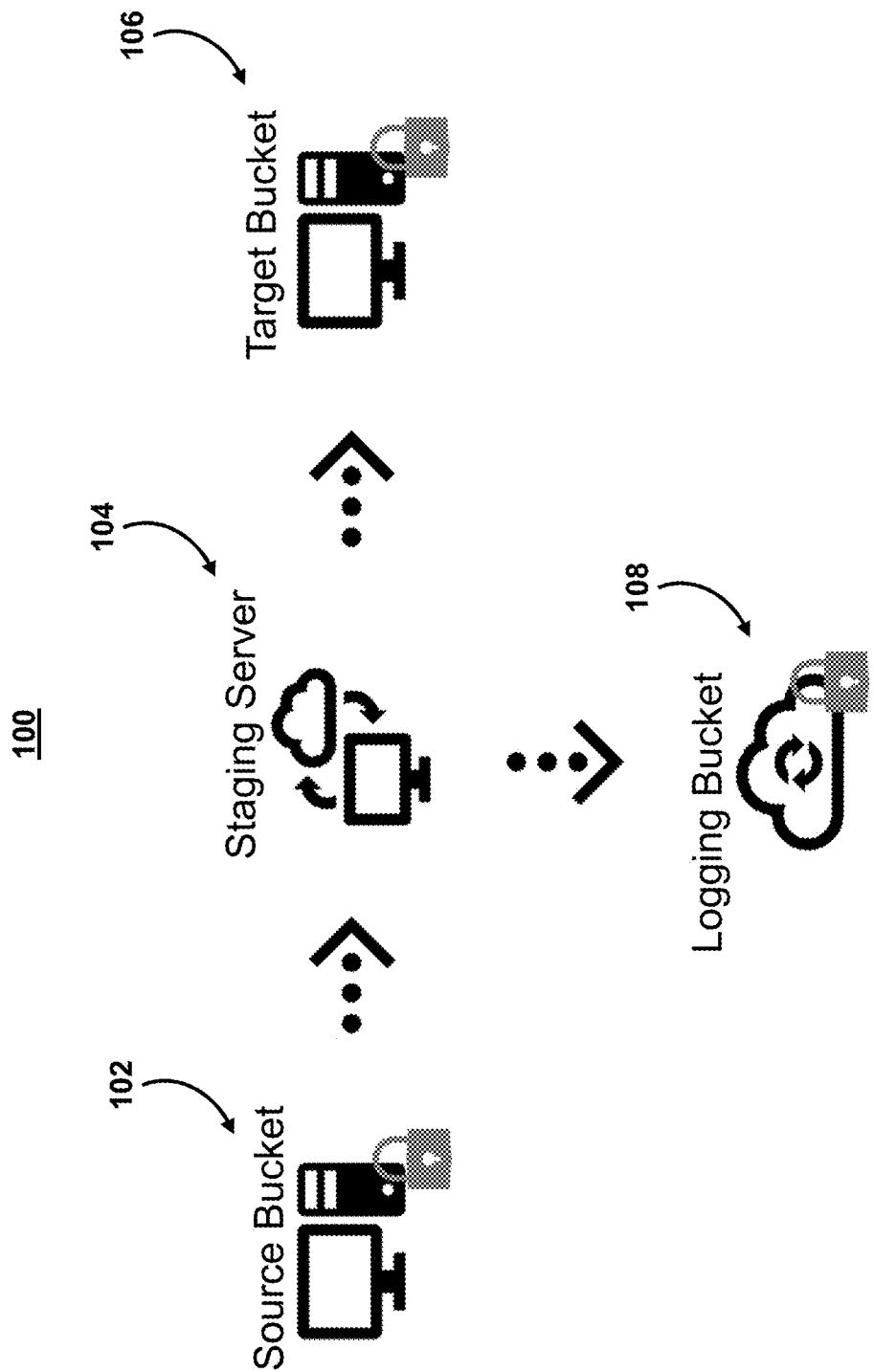
FIG. 1 shows an illustrative diagram of a data migration system, in accordance with one or more embodiments.

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Systems and methods are described herein for novel uses and/or improvements to data migration. In particular, systems and methods are described herein for data migration of metadata stored in object storage from one container to another, especially in instances when the metadata is destined for ingestion by an artificial intelligence application. More specifically, the systems and methods ensure that all metadata (e.g., metadata stored in object storage) is preserved during data migration, including metadata such as content type, object lock mode, object lock retain until date, and/or other custom metadata from one cloud-based container environment to another.

For example, the systems and methods provide resiliency for migrated infrastructure and allow for metadata from one container to be migrated away from conventional containers despite that metadata comprising highly complex workflows (e.g., such as retention buckets) as well as the dependencies thereto. These buckets can exist for internal regulatory purposes, or federally regulated purposes, or compliance purposes. In conventional systems, there is no mechanism to move any objects under retention, let alone while preserving metadata.

As described herein, "metadata" may refer to additional information or attributes associated with classes, objects, methods, properties, and other elements of a program. Metadata provides valuable information about the structure and behavior of program components, and it can be used for documentation, code analysis, reflection, and various other purposes. In some embodiments, metadata may comprise any content. As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user generated content may include content created and/or consumed by a user. For example, user generated content may include content created by another, but consumed and/or published by the user. For example, the system may monitor content generated by the user to generate user profile data. As referred to herein, "a user profile" and/or "user profile data" may comprise data actively and/or passively collected about a user. For example, the user profile data may comprise content generated by the user and a user characteristic for the user. A user profile may be content consumed and/or created by a user. User profile data may also include a user characteristic. As referred to herein, "a user characteristic" may include about a user and/or information included in a directory of stored user settings, preferences, and information for the user. For example, a user profile may have the settings for the user's installed programs and operating system. In some embodiments, the user profile may be a visual display of personal data associated with a specific user, or a customized desktop environment. In some embodiments, the user profile may be digital representation of a person's identity. The data in the user profile may be generated based on the system actively or passively monitoring.

Metadata may include name metadata (e.g., a name or unique identifier for the object, which is often used to reference and access it), class metadata (e.g., information about class-level attributes, such as class variables or static fields), method metadata (e.g., information about the method's parameters, including names, types, and default values), field metadata (e.g., information about the field, such as validation rules or serialization hints), object metadata (e.g., information about the unique identity of an object, often provided by a unique identifier or hash code), method parameters metadata (e.g., information about the parameters of a method, including parameter names, data types, and any associated annotations or attributes), annotations and attributes (e.g., annotations and attributes are a powerful way to attach metadata to various program elements, including classes, methods, fields, and parameters), reflection metadata (e.g., information that allows for runtime inspection and manipulation of metadata associated with program elements, documentation comments (e.g., well-structured comments, such as JavaDoc or XML comment), annotations processors (e.g., information that can generate additional code or perform actions based on annotations to drive code generation or behavior), and/or serialization metadata (e.g., information related to object serialization, such as field names, types, or versioning information, which is used during serialization and deserialization processes).

As described herein, metadata may be categorized into a plurality of metadata types, including descriptive metadata, structural metadata, administrative metadata, technical metadata, rights metadata, and preservation metadata. Descriptive metadata is used to provide information about the content, context, and characteristics of data or resources. It helps users discover, identify, and understand the data. Examples may include title (e.g., the title or name of the data or resource), description (e.g., a textual description or summary of the data's content), author (e.g., the creator or author of the data), date created (e.g., the date when the data was created or last modified), object size (e.g., often measured in bytes or another appropriate unit), and keywords (e.g., keywords or tags that describe the data's subject or content).

Structural metadata defines the structure or organization of data, especially in the context of complex data formats or hierarchical structures. It helps in navigating and interpreting data. Examples include file format (e.g., the format of the data file (e.g., JPEG, MP3, PDF)), data schema (e.g., the structure or schema of a database or XML document), and table of contents (e.g., structural information about chapters or sections).

Administrative metadata is used for managing and maintaining data throughout its lifecycle. It includes information about data ownership, access rights, and preservation. Examples include access control (e.g., information about who can access and modify the data), data ownership (e.g., details about the entity or person responsible for the data), version history (e.g., a record of changes and versions of the data), and retention policies (e.g., rules and policies regarding data retention and disposal).

Technical metadata describes the technical aspects of data, including its format, encoding, and technical requirements for processing or displaying the data. Examples include file size (e.g., the size of the data file in bytes), resolution (e.g., pixels per inch), encoding (e.g., the character encoding used for text data (e.g., UTF-8, ASCII)), and data type (e.g., the data type or format (e.g., integer, float) of numerical data).

Rights metadata provides information about intellectual property rights, copyright, licensing, and usage restrictions associated with data. Examples include copyright information (e.g., details about copyright holders and licensing terms), usage permissions (e.g., information about how the data can be used, shared, or redistributed), and rights holder (e.g., the entity or individual who holds rights to the data).

Preservation metadata is used to ensure the long-term preservation and accessibility of digital resources. It includes information necessary for data archiving and migration. Examples include checksums (e.g., hash values or checksums to verify data integrity), format migration information (e.g., details on how data formats will be migrated over time), and provenance (e.g., information about the history and origins of data).

Metadata, and types of metadata, may be stored in various manners. For example, object storage, file storage, and block storage are three distinct types of storage technologies used in computing and data storage. They differ in terms of their architecture, use cases, and how they store and manage data.

Block storage divides data into fixed-sized blocks and stores each block as an individual unit with a unique address. These blocks are managed by a storage controller or storage area network (SAN). Block storage is commonly used for critical applications where performance, reliability, and consistency are essential, such as databases and virtual machines (VMs). It is often used in enterprise environments where high I/O operations are required. Characteristics of block storage include low-level storage (e.g., applications and file systems manage the data structure, making it flexible for customizations), high performance and low latency, lacking file structure or metadata awareness (e.g., no awareness of the data's content or file hierarchy), and data access is at the block level (e.g., each block treated as a separate entity).

File storage organizes data into files and directories. It uses a file system to manage metadata and hierarchical structures. File storage is suitable for shared data and file sharing scenarios. It is commonly used in network-attached storage (NAS) systems for home and office file sharing as it is appropriate for applications that require easy access to files and directories. Characteristics of file storage include organization of data into a hierarchical structure with directories and files, support for file-level access permissions and access control lists (ACLs), and automatic provision of metadata about files, such as file names, sizes, and timestamps.

Object storage stores data as objects, each of which contains the data, metadata, and a unique identifier. Objects are organized in a flat namespace and can be stored across multiple servers or storage nodes. Object storage is designed for storing vast amounts of unstructured data, such as backups, archives, media files, and cloud-based data storage. Characteristics of object storage is that it stores data as objects, each with a unique identifier (e.g., a URL). Object storage is very scalable and useful for distributed architectures, making it suitable for large-scale data storage. It is ideal for scenarios where metadata is crucial, as each object contains metadata. Object storage systems are highly durable and resilient to hardware failures. Additionally, object storage is compatible with RESTful APIs for data access.

Object storage, file storage, and block storage have some key differences as it relates to data structure, use cases, metadata, scalability and redundancy, and access methods. With respect to data structure, block storage deals with raw blocks of data, often at the lowest level, without knowledge of the file structure. File storage organizes data into a hierarchical file and directory structure. Object storage stores data as objects, each with associated metadata. With respect to use cases, block storage is suitable for performance-critical applications and virtualization. File storage is ideal for shared file systems and environments where data is organized in directories and files. Object storage is designed for scalable, unstructured data storage and retrieval, especially in cloud and archive scenarios. With respect to metadata, block storage typically lacks metadata about data content. File storage includes file metadata (e.g., file names, permissions). Object storage embeds metadata with each object, making it suitable for content-rich data. With respect to scalability and redundancy, block storage and file storage may rely on complex redundancy configurations. Object storage systems are designed for easy scalability and built-in redundancy. With respect to access methods, block storage and file storage use block-level and file-level access, respectively. Object storage provides object-level access via HTTP-based APIs.

FIG. 1 shows an illustrative diagram of a data migration system, in accordance with one or more embodiments. For example, system 100 may be used for data retention while migrating metadata stored in object storage of objects being migrated across container ecosystems.

System 100 include source location 102. Source location 102 may comprise a data source or repository within a cloud computing environment where data is stored. Source location 102 may comprise any computing device that provides data for migration. System 100 also includes target location 106, which may also comprise a data source for receiving data in a migration.

System 100 include staging server 104. As described herein, a staging server, in the context of cloud data migration, may refer to an intermediary environment or platform that serves as a transitional step in the data migration process. It acts as a temporary storage and processing area for data that is being moved from a source location (e.g., source location 102) to a target location (e.g., target location 106) within the cloud. Staging server may comprise any computing component used to facilitate the efficient, organized, and/or controlled transfer of data during a migration project. For example, in some embodiments, system 100 may generate a first supplemental data structure comprising on an array and a first source identifier. The system may then store the first supplemental data structure at a staging location.

During data migration, data may be initially extracted from the source location 102 or systems and collected in staging server 104. This step may involve exporting data from databases, files, or other data sources (e.g., source location 102). At staging server 104, the system may perform one or more data transformation. For example, data often needs to be transformed or converted to match the format, structure, or schema required by the target system in the cloud. Staging server 104 may be used for this purpose, allowing data transformation scripts or tools to process the data before it's moved to target location 106. Staging server 104 may also be used for data validation, which involves checking for errors, inconsistencies, or missing information in the data. Staging server 104 may also be used for data cleansing and enrichment tasks can also take place within the staging server.

Staging server 104 may also perform migration testing, which involves verifying that the migration process works as expected, and the data will be accurately transferred to the target environment. Staging server 104 may also be used to optimize the performance of data migration. For example, data can be preloaded into the staging server to reduce downtime during the final migration step.

Additionally or alternatively, staging server 104 may have security measures in place to protect sensitive data during the migration process. Access controls, encryption, and audit trails can be implemented to ensure data security. In case of unexpected issues during migration, staging server 104 can act as a safeguard. If data migration to the target fails or results in undesirable outcomes, the process can be rolled back to a previous state in the staging environment without affecting the production environment.

Once data has been validated, transformed, and tested in staging server 104, the system may migrate the data to target location 106, which may be a cloud-based storage, database, or application in the target environment.

System 100 include logging location 108. For example, logging location 108 may comprise a server that is used to centralize and store log data generated during the migration process. The primary purpose of a logging server is to capture and record various events, activities, and errors that occur throughout the data migration, providing a centralized repository for monitoring, troubleshooting, and auditing purposes. For example, logging location 108 may comprise a log collection. During the data migration process, numerous events and activities are logged by various components involved in the migration. These logs can include information about data transfers, transformations, validation checks, errors, and other relevant details. Logging location 108 collect and store these logs in a structured and organized manner.

Logging location 108 may also provide a centralized location for storing logs, ensuring that all relevant data is easily accessible in one place. This centralization simplifies the process of monitoring and managing logs compared to scattered logs across different systems or resources. For example, data migration logs are valuable for monitoring the progress of the migration in real-time. Monitoring tools and dashboards can be set up to analyze log data, providing insights into the performance, status, and health of the migration. Operators can quickly identify issues and take corrective actions as needed. When errors or issues arise during the migration, logs stored on logging location 108 are a valuable resource for troubleshooting. IT and operations teams can review log entries to pinpoint the root causes of problems and determine the necessary actions for resolution.

Many organizations have regulatory and compliance requirements that mandate the retention of detailed logs for data migration activities. Logging location 108 may help meet these requirements by securely storing comprehensive records of data migration events. These logs can be used for auditing and compliance reporting. Log data can also be used for performance optimization and tuning. By analyzing logs, organizations can identify bottlenecks, optimize data transfer processes, and fine-tune the migration workflow for better efficiency. Furthermore, these logs may be used as training data for artificial intelligence applications.

Logging servers often have security features to protect log data from tampering or unauthorized access. Access controls and encryption may be implemented to ensure the integrity and confidentiality of log records. For example, even after the migration is complete, logs stored on logging location 108 serve as historical records of the migration process. These records can be valuable for post-migration analysis, reporting, and documentation. For example, when generating the array of the first object-stored metadata, the system may input the first object-stored metadata into an artificial intelligence model, wherein the artificial intelligence model is trained on object-stored metadata samples to generate arrays of data. The system may receive an output from the artificial intelligence model, wherein the array is based on the output. The object-stored metadata sample comprise data comprise historical records of the migration process and/or post-migration analysis, reporting, and documentation.

In some embodiments, the system may generate a first entry in a retention log of the staging location, wherein the first entry corresponds to the first object. The system may generate a second entry in the retention log of the staging location, wherein the second entry corresponds to the first supplemental data structure. For example, the system may log supplemental data structures and objects separately in order to facilitate the supplemental data structures being migrated separately (albeit simultaneously) from the objects. By doing so, the system may avoid the data ingestion procedures of the target source that may modify and/or delete the metadata.

Figure 2A:
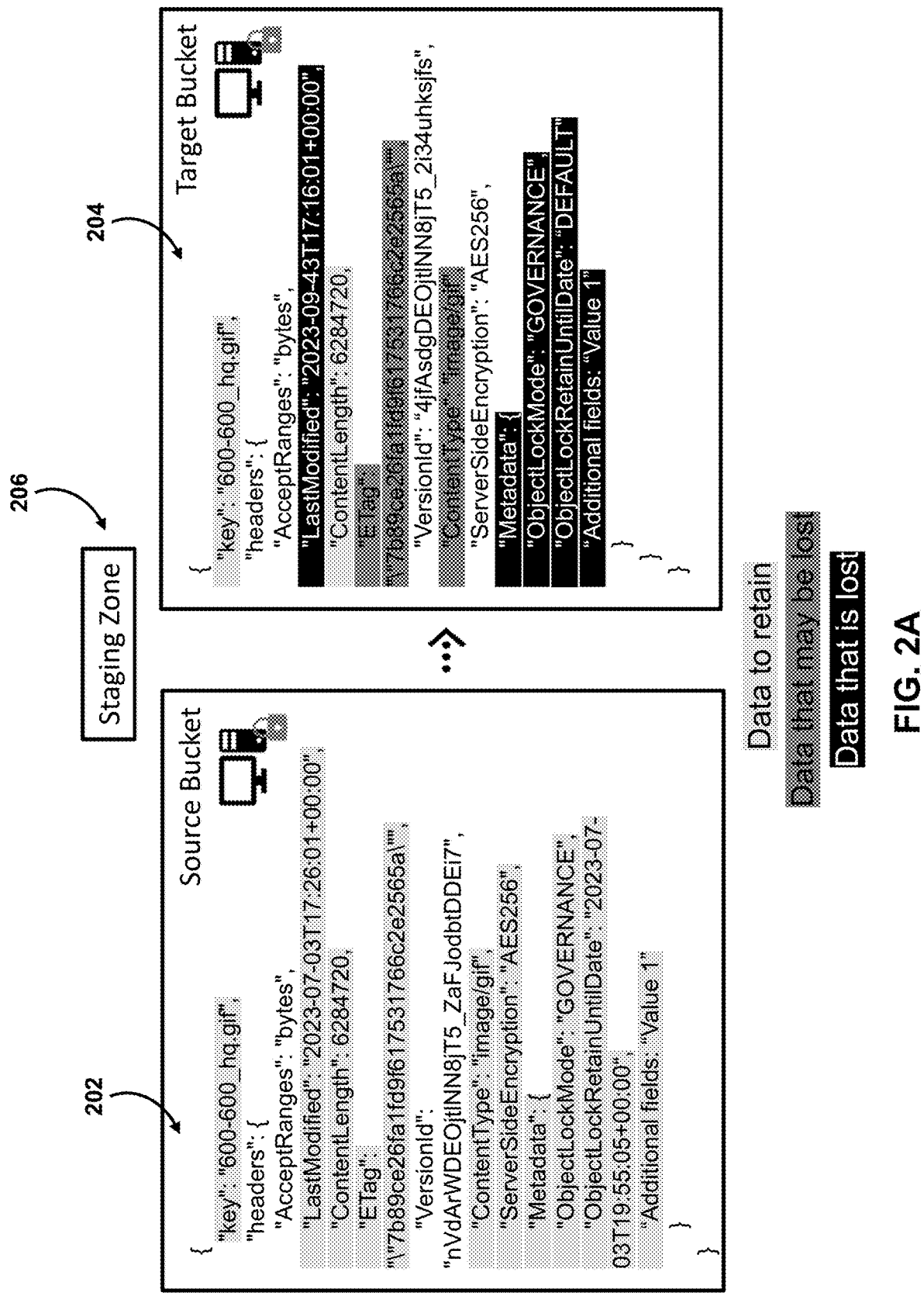
Figure 2B:
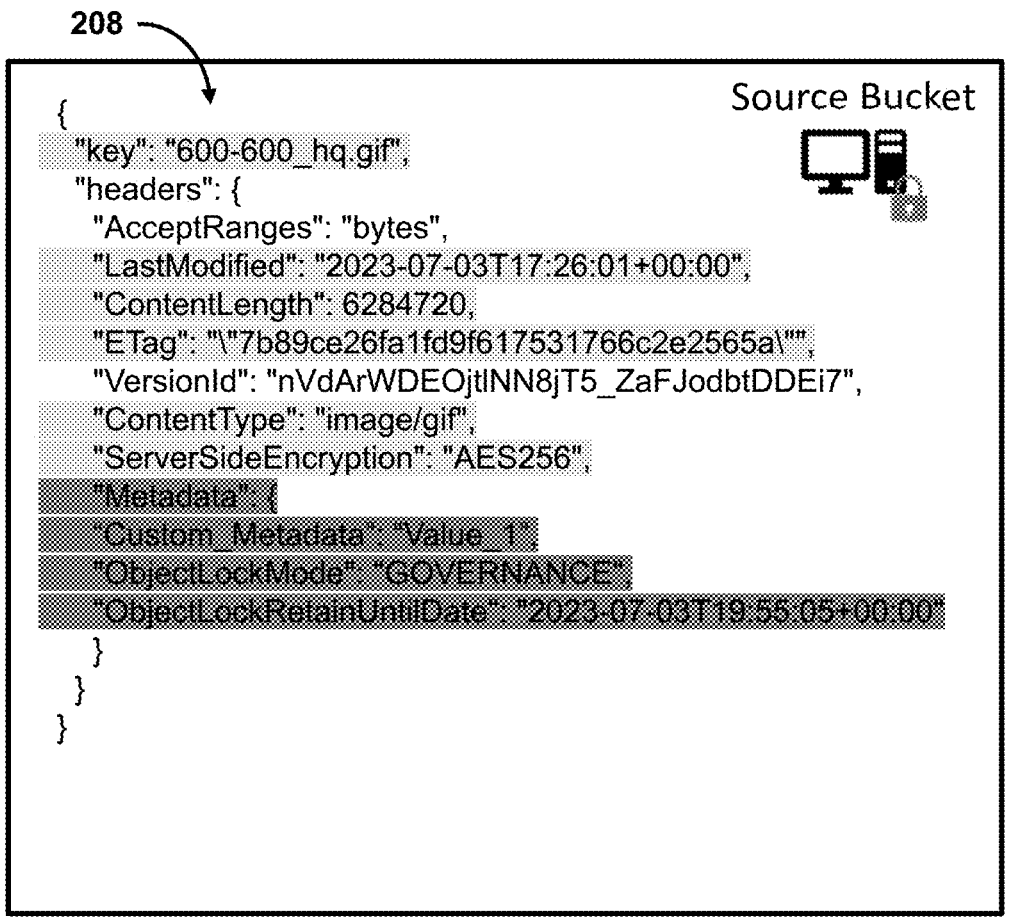
Figure 2B:
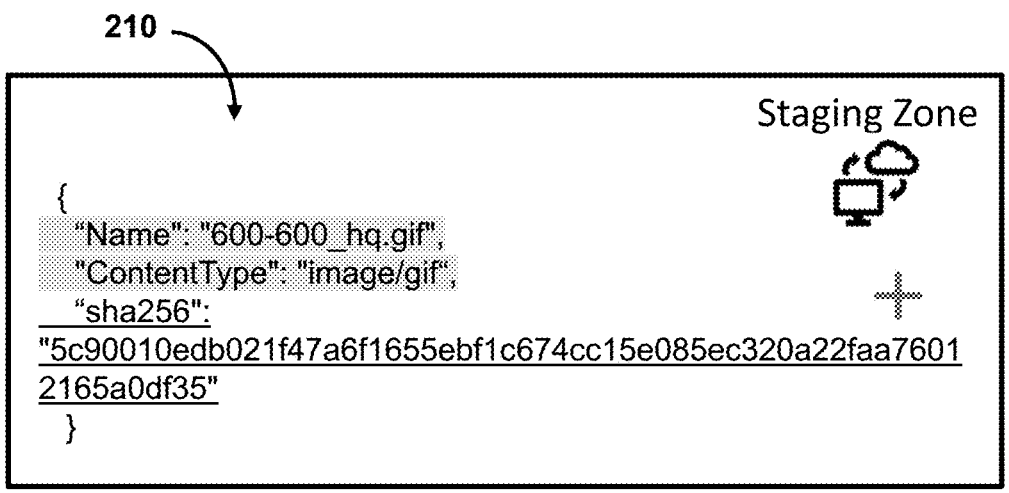

FIGS. 2A-C shows illustrative diagrams of metadata that is retained during migration, in accordance with one or more embodiments. For example, the system may receive, at a user interface, a first user input requesting that a first object, at a source location, be migrated to a target location. As referred to herein, a "user interface" may comprise a human-computer interaction and communication component for a device, and may include display screens, keyboards, a mouse, and the appearance of a desktop. For example, a user interface may comprise a way a user interacts with an application or a website. For example, the system may receive, at a user interface, a first user input requesting that the first object be migrated. The system may receive, at the user interface, a second user input identifying the source location. The system may receive, at the user interface, a third user input identifying the target location.

As shown in FIG. 2A, the first object may comprise metadata 202 and metadata 204. Metadata 202 may comprise metadata that is retained (e.g., file property metadata), metadata that may be lost, and metadata that is lost (e.g., object-stored metadata) in a conventional system as shown by metadata 204. For example, as the first object is transitioned from a source location to a target location via staging location 206, object-stored metadata present in metadata 202 is lost in metadata 204 (as indicated in FIG. 2A). In order to ensure that the data marked in FIG. 2A, as metadata that may be lost or data that is lost, the system may generate supplemental data structure 210 as shown in FIG. 2B.

As described herein, the "supplemental data structure" may refer to an additional data structure or set of information that complements the primary metadata associated with the object. This supplemental data structure may be used to provide additional context, details, and/or annotations about the object and/or object-stored metadata for the object, enhancing its usability and understanding. The purpose of supplemental data structures is to enrich the metadata and provide a more comprehensive description of the object-stored metadata for the object.

The supplemental data structures may include tagging or categorization systems. Tags or labels can be applied to assets to indicate their content, topic, or relevance. Taxonomies, which are hierarchical structures of categories or terms, provide a structured way to organize and navigate metadata. Additionally or alternatively, the supplemental data structure may comprise user comments and/or annotations. For example, users may add comments, notes, or annotations to an asset to provide context, explanations, or feedback. These comments can be part of the supplemental data associated with the object.

Additionally or alternatively, the supplemental data structure may comprise a version history for the object. For objects that undergo revisions, a version history is a supplemental data structure that tracks changes over time. It includes information about who made the changes, when they were made, and the nature of the changes. Additionally or alternatively, the supplemental data structure may comprise usage statistics. For example, supplemental data can include statistics related to the object's usage, such as the number of views, downloads, or interactions. These statistics help gauge the object's popularity and usefulness (and/or need for retention).

Additionally or alternatively, the supplemental data structure may comprise access control and permissions. For example, information about who has access to the object and what permissions they have (e.g., read-only, edit). Supplemental data structures may also include links to related objects or resources. For geospatial objects, such as maps or location-based data, supplemental data structures can include coordinates, geographic boundaries, and spatial reference information. Many systems allow for custom fields or attributes to capture specific information that is not covered by the standard metadata schema. These custom fields become part of the supplemental data.

Additionally or alternatively, the supplemental data structure may comprise information about how objects are related to each other, such as parent-child relationships, dependencies, or references. Information about the source of the object, its creators, contributors, and licensing details may be included in supplemental data structures.

Additionally or alternatively, the supplemental data structure may comprise detailed event logs or audit trails that may be stored in a logging server (e.g., logging location 108 (FIG. 1)). These logs record significant events related to the object, such as creation, modification, or access.

As shown in FIG. 2B, metadata 208 includes preserved source data and consistent retention data that is preserved during the data migration using supplemental data structure 210. For example, the system may determine object-stored metadata for an object (e.g., metadata 208). The system may then generate an array an array of the object-stored metadata of that information (e.g., highlighted as supplemental staging data in supplemental data structure 210).

In order to consistently retained metadata 208, the system may generate an array that stores a collection of elements for metadata 208, in a linear, contiguous memory location. For example, the system may use the array to organize and manage metadata 208 in a structured way, allowing for efficient access, retrieval, and manipulation of elements based on their position or index within the array. To improve the efficiency of data retention, the array typically stores elements of the same data type (e.g., integers, floating-point numbers, characters, or objects of a specific class). This homogeneity allows for efficient memory allocation and element access. The system may also use a fixed size array. For example, the size or length of an array may be fixed when it is created. Once an array is created with a specific size, it cannot be resized without creating a new array and copying elements.

As shown in FIG. 2B, the system may generate a hash value for the array. The hash value may be used to ensure (via data validation) that metadata 208 has been preserved. For example, the system may generate a first hash value of a first object-stored metadata. The system may then include the first hash value in supplemental data structure 210. Hashing metadata involves generating a fixed-length string or code (the hash value) from the metadata associated with a digital asset. Hashing is a one-way process, meaning that it is easy to compute the hash value from the metadata, but computationally infeasible to reverse the process and recreate the original metadata from the hash value. To do so, the system may select a cryptographic hash function such as MD5, SHA-1, SHA-256, and SHA-512. Choose a hash function that meets your security and performance requirements. The system may also ensure that the metadata to be hashed in a consistent and well-defined format. This may involve encoding the metadata into a specific character encoding (e.g., UTF-8) and removing any unnecessary whitespace or formatting. The system may then apply the selected hash function to the metadata. The hash function will generate a fixed-length hash value (digest) based on the input metadata.

The system may then validate, using the first hash value, that the first object-stored metadata has been successfully migrated to the target location using the hash. For example, hashing metadata may be used for data integrity verification, digital signatures, and ensuring that metadata remains unaltered during transmission or storage. Validating hashed metadata involves verifying that the metadata has not been tampered with or corrupted during transmission or storage. To do this, the system ay compare the computed hash value of the received or stored metadata with a reference hash value (the original hash). If the computed hash matches the reference hash, the metadata is considered valid and unchanged; otherwise, it may have been altered.

As shown in FIG. 2C, metadata 212 may receive a hashed value (e.g., a hash of an array). Metadata 212 may represent metadata received at a target location (e.g., target location 106 (FIG. 1)). The system may compare the hashed value in metadata 212 to the hashed value in supplemental data structure 210 to ensure that the data is consistent. Upon determining that the data is consistent in metadata 212 and/or the data migration is complete. The system may receive a data migration confirmation that the object and the object-stored metadata have been successfully migrated to the target location (e.g., target location 106 (FIG. 1)). The system may then delete the supplemental data structure 210 from a staging location (and/or transfer it to a logging server).

As shown in FIG. 2C, the system may execute a first function that causes the object to be migrated from the source location (e.g., represented by metadata 208 (FIG. 2A)) to the target location (e.g., represented by metadata 212 (FIG. 2C)). The system may perform this by changing a first source identifier in the supplemental data structure 210 (FIG. 2B) to a second source identifier, wherein the second source identifier corresponds to the object at the target location.

For example, the source identifier may a unique identifier associated with an object. This identifier can be used to distinguish one object from another, especially in scenarios where multiple objects of the same class exist. For example, in a database or data structure, each object could have a unique identifier or key. For example, the source identifier may be a portion of the metadata associated with the object that indicates its source or origin. This metadata could include information about the system, process, or user that created or owns the object.

In some embodiments, the system may also use other types of information in the supplemental data structure to identify object-stored metadata specific to a given object. For example, the system may identify an object at a target location based on a name and content type (e.g., as shown in supplemental data structure 210 (FIG. 2B)).

For example, the system may generate a first name of the first object-stored metadata. The system may include the first name in the first supplemental data structure. The system may, in response to executing the first function, generate a second object at the target location, wherein the second object corresponds to the first object, and wherein the second object comprises a second name. The system may determine that the first supplemental data structure corresponds to the second object based on comparing the first name to the second name. The system may, in response to determining that the first supplemental data structure corresponds to the second object, populate second object-stored metadata for the second object based on the first supplemental data structure.

Additionally or alternatively, the system may generate a first content type of the first object-stored metadata. The system may include the first content type in the first supplemental data structure. The system may, in response to executing the first function, generate a second object at the target location, wherein the second object corresponds to the first object, and wherein the second object comprises a second content type. The system may determine that the first supplemental data structure corresponds to the second object based on comparing the first content type to the second content type. The system may, in response to determining that the first supplemental data structure corresponds to the second object, populate second object-stored metadata for the second object based on the first supplemental data structure.

As shown in FIG. 2C, the system may populate object-stored metadata for an object at the target location based on the supplemental data structure. By doing so, the integrity of the object-stored metadata is preserved. The system then performs the data migration and changes the link in the object identifier from a first object header at the source location to a second object header at the target location as part of the same function as the data migration of the object. Through the use of the supplemental data structure and its transfer via the changing identifier, the object-stored metadata that was stored at the source location is now stored with the object at the target location. Furthermore, the data included in the supplemental data structure is not subject to data migration ingestion procedures at the target location and thus is preserved in its native form. Accordingly, object-stored metadata (e.g., last modified date) remains in its native form (e.g., reflecting the date the data was last modified at the source location) and is not changed based on the ingestion procedure at the target location (e.g., to reflect the date of the data migration).

For example, in response to executing the first function, the system may generate a second object at the target location, wherein the second object corresponds to the first object. The system may populate second object-stored metadata for the second object based on the first object-stored metadata. The system may then validate the second object-stored metadata using a first hash value that generated based on the first object-stored metadata. The system may then generate for display, on a user interface, a data migration confirmation based on validating the second object-stored metadata using the first hash value, wherein the data migration confirmation indicates that the first object-stored metadata was successfully migrated to the target source.

Figure 3A:
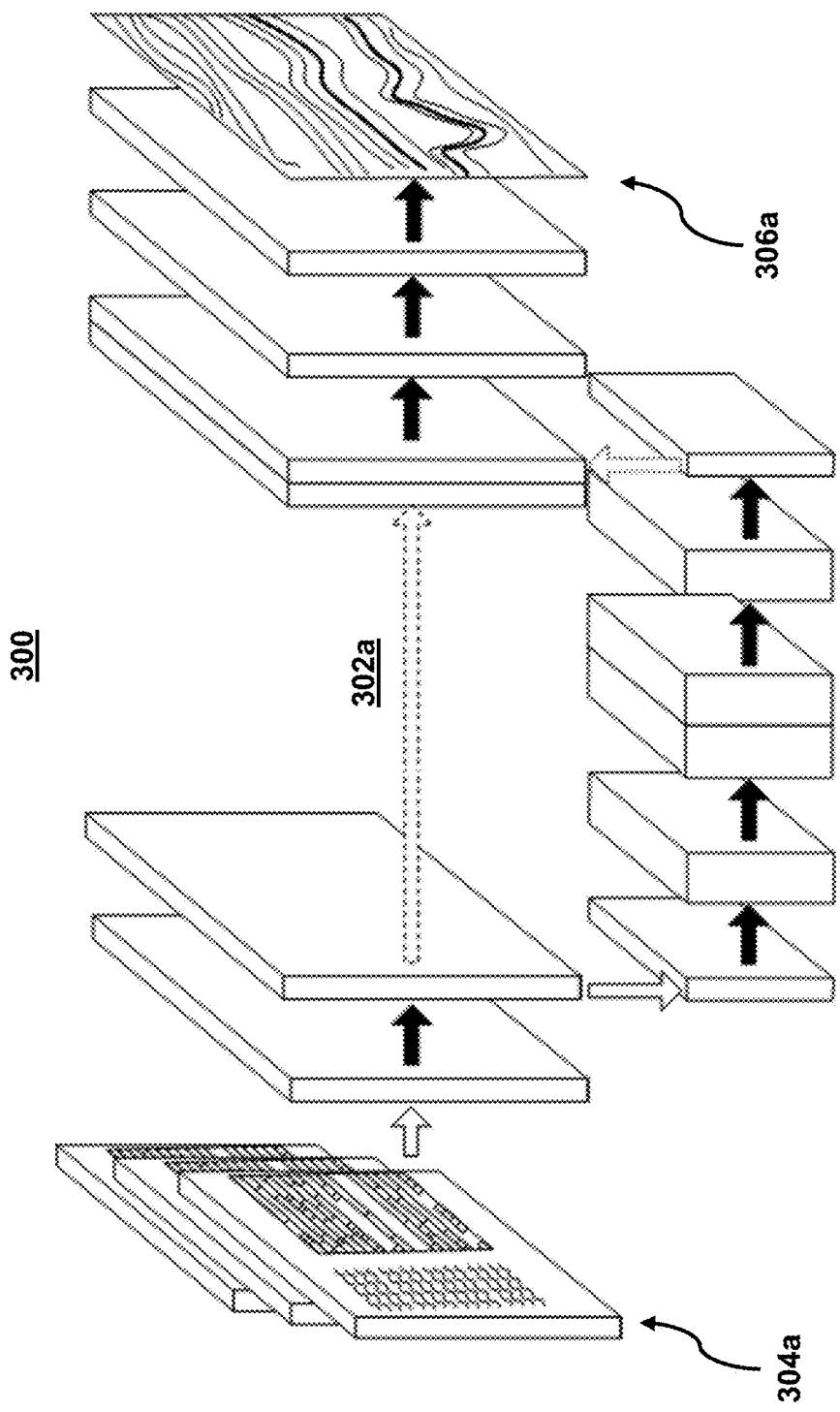
FIGS. 3A-B shows illustrative components for a system used for data migration, in accordance with one or more embodiments.
Figure 3B:
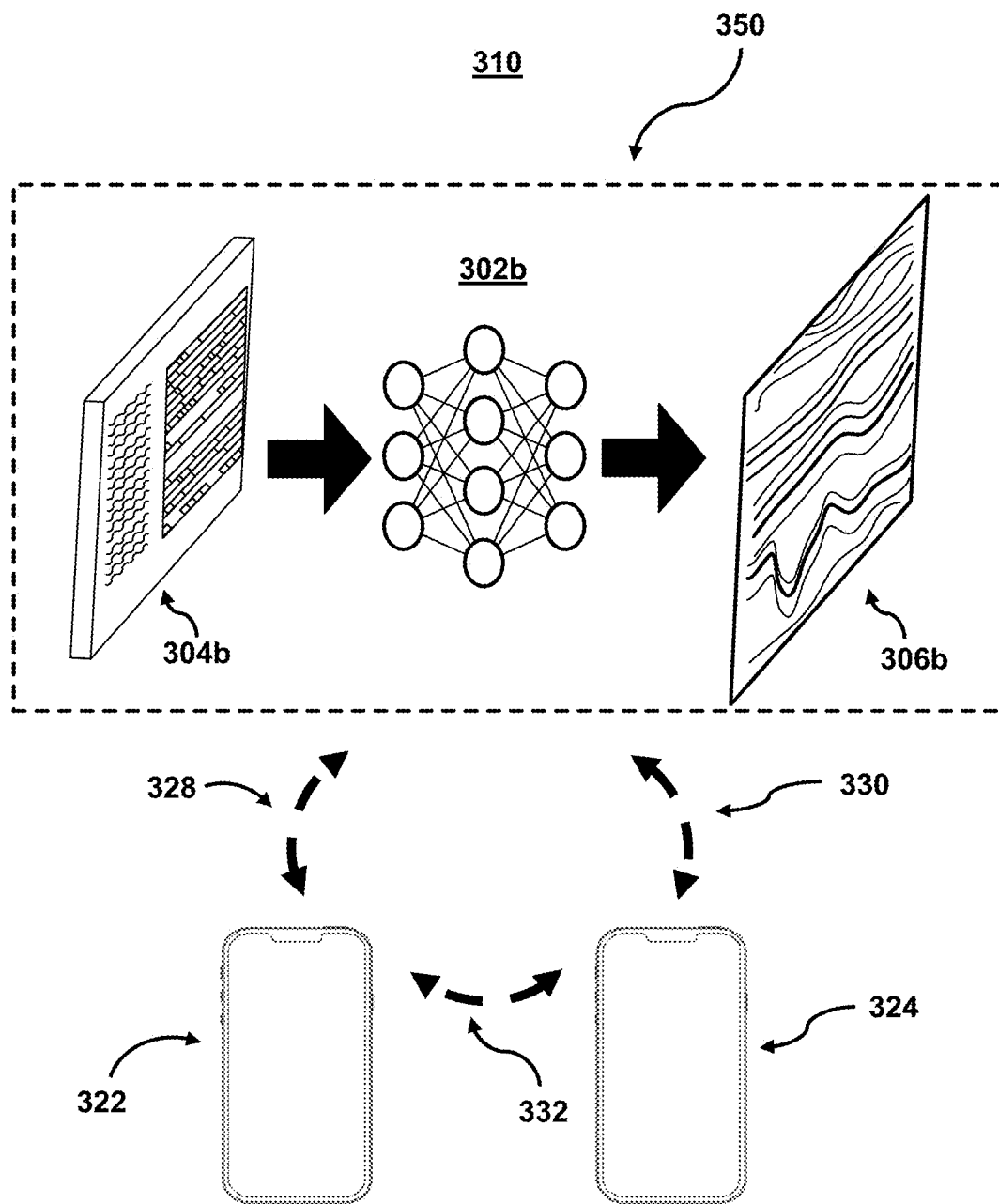

FIGS. 3A-B shows illustrative components for a system for a system used for data migration, in accordance with one or more embodiments. For example, FIG. 3A may represent a model architecture used for data retention while migrating metadata stored in object storage of objects being migrated across container ecosystems.

System 300 also includes model 302a, which may be a machine learning model, artificial intelligence model, etc. (which may be referred collectively as "models" herein). Model 302a may take inputs 304a and provide outputs 306a. The inputs may include multiple datasets, such as a training dataset and a test dataset. Each of the plurality of datasets (e.g., inputs 304a) may include data subsets related to user data, predicted forecasts and/or errors, and/or actual forecasts and/or errors. In some embodiments, outputs 306a may be fed back to model 302a as input to train model 302 (e.g., alone or in conjunction with user indications of the accuracy of outputs 30a6, labels associated with the inputs, or with other reference feedback information). For example, the system may receive a first labeled feature input, wherein the first labeled feature input is labeled with a known prediction for the first labeled feature input. The system may then train the first model to classify the first labeled feature input with the known prediction (e.g., a supplemental data structure, migration function, an array, etc.).

In a variety of embodiments, model 302a may update its configurations (e.g., weights, biases, or other parameters)

based on the assessment of its prediction (e.g., outputs 306a) and reference feedback information (e.g., user indication of accuracy, reference labels, or other information). In a variety of embodiments, where model 302a is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302a may be trained to generate better predictions.

In some embodiments, the model (e.g., model 302a) may automatically perform actions based on outputs 306. In some embodiments, the model (e.g., model 302a) may not perform any actions. The output of the model (e.g., model 302a) may be used to determine a supplemental data structure, migration function, an array, etc.

FIG. 3B shows illustrative components for a system used for data migration, in accordance with one or more embodiments. For example, FIG. 3B may show illustrative components for retention of data while migrating metadata, stored in object storage of objects being migrated, across container ecosystems to preserve the data for artificial intelligence applications. As shown in FIG. 3B, system 310 may include mobile device 322 and mobile device 324. While shown as a smartphone, respectively, in FIG. 3, it should be noted that mobile device 322 and mobile device 324 may be any computing device, including, but not limited to, a laptop computer, a tablet computer, a hand-held computer, and other computer equipment (e.g., a server), including "smart," wireless, wearable, and/or mobile devices. System 300 may also include cloud components. For example, cloud components may be implemented as a cloud computing system, and may feature one or more component devices. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by cloud components. In some embodiments, the various computers and systems described herein may include one or more computing devices that are programmed to perform the described functions. Additionally, or alternatively, multiple users may interact with system 300 and/or one or more components of system 300.

With respect to the components of mobile device 322 and mobile device 324, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and mobile device 324 include a user interface upon which to display data.

Additionally, as mobile device 322 and mobile device 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3B also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

System 310 also includes API ("application programming interface") layer 350. API layer 350 may allow the system to generate summaries across different devices. In some embodiments, API layer 350 may be implemented on mobile device 322 or mobile device 324. Alternatively or additionally, API layer 350 may reside on one or more of system 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

For example, in some embodiments, executing a function (e.g., a function to perform a data migration) may comprise generating an API request or multiple API requests. For example, the system may determine a first API for a target location. The system may then generate a first API request, using the first API, wherein the first API request communicates the first object from the source location to the target location. The system may then generate a second API request, using the first API, wherein the second API request communicates the first object-stored metadata from the staging location to the target location.

In some embodiments, the system may receive a notification that the first function is executed. The system may, in response to receiving the notification, execute a second function that causes the first object-stored metadata to be migrated from the staging location to the target location based on the second source identifier.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDOS protection, and API layer 350 may use RESTful APIs as standard for external integration.

As shown in FIG. 3B, in some embodiments, model 302b may be trained by taking inputs 304b and provide outputs 306b. Model 302b may include an artificial neural network. In such embodiments, model 302b may include an input layer and one or more hidden layers. Each neural unit of model 302b may be connected with many other neural units of model 302b. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302b may be self-learning and trained, rather than explicitly programmed, and can perform significantly better in certain areas of problem solving, as compared to traditional computer programs. During training, an output layer of model 302 may correspond to a classification of model 302b, and an input known to correspond to that classification may be input into an input layer of model 302b during training. During testing, an input without a known classification may be input into the input layer, and a determined classification may be output.

In some embodiments, model 302b may include multiple layers (e.g., where a signal path traverses from front layers to back layers). In some embodiments, back propagation techniques may be utilized by model 302b where forward stimulation is used to reset weights on the "front" neural units. In some embodiments, stimulation and inhibition for model 302 may be more free-flowing, with connections interacting in a more chaotic and complex fashion. During testing, an output layer of model 302b may indicate whether or not a given input corresponds to a classification of model 302b (e.g., a supplemental data structure, migration function, an array, etc.).

Model 302b is shown as a convolutional neural network. A convolutional neural network consists of an input layer (e.g., input 304a), hidden layers, and an output layer (e.g., output 306b). As shown in FIG. 3B, the middle layers are called hidden because their inputs and outputs are masked by the activation function and final convolution. In a convolutional neural network, the hidden layers include layers that perform convolutions. Model 302b may comprise convolutional layers that convolve the input and pass its result to the next layer. Model 302b includes local and/or global pooling layers along with traditional convolutional layers. Pooling layers reduce the dimensions of data by combining the outputs of neuron clusters at one layer into a single neuron in the next layer. Also as shown, model 302b may comprise fully connected layers that connect every neuron in one layer to every neuron in another layer.

Figure 4:
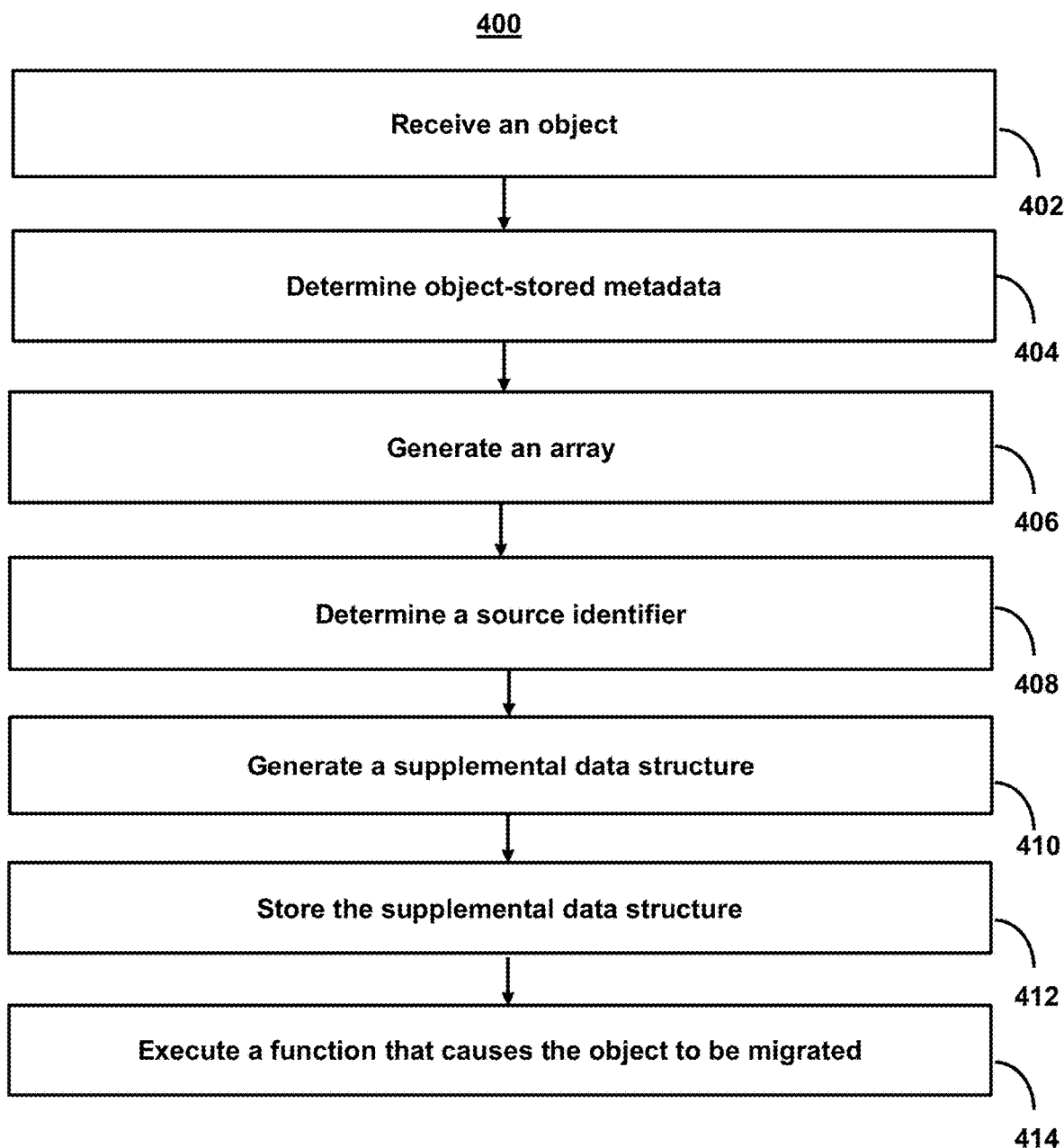
FIG. 4 shows a flowchart of the steps involved in migrating metadata stored in object storage of objects, in accordance with one or more embodiments.

FIG. 4 shows a flowchart of the steps involved in migrating metadata stored in object storage of objects, in accordance with one or more embodiments. For example, the system may use process 400 (e.g., as implemented on one or more system components described above) for retention of data while migrating metadata, stored in object storage of objects being migrated, across container ecosystems to preserve the data for artificial intelligence applications.

At step 402, process 400 (e.g., using one or more components described above) receives an object. For example, the system may receive a first object, at a source location, for migration to a target location. For example, the first object may be included in a subset of data at a source location that is designated to be a part of a data migration.

At step 404, process 400 (e.g., using one or more components described above) determines object-stored metadata. For example, the system may determine first object-stored metadata for the first object. For example, object-stored metadata may refer to additional information or attributes associated with an object that are stored alongside the object itself. Notably, object-stored metadata is typically deleted and/or modified in a conventional data migration process.

At step 406, process 400 (e.g., using one or more components described above) generates an array. For example, the system may generate an array of the first object-stored metadata. The array may codify object-stored metadata such that it is not changed or deleted during the migration process. For example, the array may comprise key-value pairs, where each key corresponds to a specific attribute or property, and the associated value provides information about that attribute. For example, the system may generate metadata keys for "title," "author," "creation date," "content type," etc. The array then codifies these metadata keys to ensure that the values are not changed. Moreover, the system may generate new object-stored metadata (e.g., for a new object at a target location) based on the metadata keys.

Additionally or alternatively, the system may include new metadata that was not found in the original object-stored metadata (e.g., for an object at a source location). The new metadata may include additional attributes and/or rules (e.g., retention rules) that are applied to the new object. For example, the system may generate a third object-stored metadata for the first object, wherein the third object-stored metadata is not included in the first object-stored metadata. The system may include the third object-stored metadata in the first supplemental data structure. In response to executing the first function, the system may generate a second object at the target location, wherein the second object corresponds to the first object, and wherein the second object comprises the third object-stored metadata.

For example, a data retention rule for objects may be a predefined policy or set of guidelines that specifies how long data objects should be retained and under what conditions they should be deleted or archived. Data retention rules are a crucial aspect of data management and compliance, helping organizations manage data in a way that aligns with legal, regulatory, and business requirements. The data retention rule may comprise a retention period (e.g., a duration for which objects should be retained), archiving rules (e.g., rules that specify that objects should be archived rather than deleted), and/or deletion rules (e.g., rules that may specify when objects should be deleted after the retention period has passed).

In some embodiments, the system may compare metadata in a supplemental data structure to metadata generated at a target location as part of a data migration. For example, if an object has a "last modified" date generated as part of a data migration to a target location, the system may compare this value to values from another category in the supplemental data structure. In response to an inconsistency, the system may use the value form the supplemental data structure. For example, the system may compare fourth object-stored metadata to the third object-stored metadata, wherein the fourth object-stored metadata is generated at the target location in response to migrating the first object. The system may determine an inconsistency between the fourth object-stored metadata and the third object-stored metadata. The system may modify the fourth object-stored metadata based on the inconsistency.

At step 408, process 400 (e.g., using one or more components described above) determines a source identifier. For example, the system may determine a first source identifier, wherein the first source identifier corresponds to the first object at the source location. In some embodiments, the source identifier may comprise a name, content type, and/or other information to identify as object corresponding to supplemental data structures.

At step 410, process 400 (e.g., using one or more components described above) generates a supplemental data structure. For example, the system may generate a first supplemental data structure comprising the array and the first source identifier. The supplemental data structure may be used to house (in a format that avoid changes and/or deletion) of object-stored metadata for the object.

At step 412, process 400 (e.g., using one or more components described above) stores the supplemental data structure. For example, the system may store the first supplemental data structure at a staging location. By storing the supplemental data structure at the staging location, the system may avoid the supplemental data structure from being affected by any data migration procedures and/or protocols for at the target source that may affect the data.

In some embodiments, the storing the supplemental data structure at the staging location allows for the staging location to perform any formatting and/or pre-processing requirements. For example, the system may determine a compatibility requirement of the target location. The system may format the first supplemental data structure based on the compatibility requirement.

At step 414, process 400 (e.g., using one or more components described above) executes a function that causes the object to be migrated. For example, the system may execute a first function that causes the first object to be migrated from the source location to the target location and changes the first source identifier in the first supplemental data structure to a second source identifier, wherein the second source identifier corresponds to the first object at the target location.

For example, by performing the data migration by changing the link in the object identifier from a first object header at the source location to a second object header at the target location as part of the same function as the data migration of the object, the object-stored metadata that was stored at the source location is now stored with the object at the target location. Furthermore, the data included in the supplemental data structure is not subject to data migration ingestion procedures at the target location and thus is preserved in its native form. Accordingly, object-stored metadata (e.g., last modified date) remains in its native form (e.g., reflecting the date the data was last modified at the source location) and is not changed based on the ingestion procedure at the target location (e.g., to reflect the date of the data migration).

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for data retention while migrating metadata stored in object storage of objects being migrated across container ecosystems.

2. The method of the preceding embodiment, further comprising: receiving a first object, at a source location, for migration to a target location; determining first object-stored metadata for the first object; generating an array of the first object-stored metadata; determining a first source identifier, wherein the first source identifier corresponds to the first object at the source location; generating a first supplemental data structure comprising on the array and the first source identifier; storing the first supplemental data structure at a staging location; and executing a first function that causes the first object to be migrated from the source location to the target location and changes the first source identifier in the first supplemental data structure to a second source identifier, wherein the second source identifier corresponds to the first object at the target location.

3. The method of any one of the preceding embodiments, further comprising: generating a first hash value of the first object-stored metadata; including the first hash value in the first supplemental data structure; and validating, using the first hash value, that the first object-stored metadata has been successfully migrated to the target location.

4. The method of any one of the preceding embodiments, further comprising: receiving a data migration confirmation that the first object and the first object-stored metadata have been successfully migrated to the target location; and deleting the first supplemental data structure from the staging location.

5. The method of any one of the preceding embodiments, further comprising: in response to executing the first function, generating a second object at the target location, wherein the second object corresponds to the first object; populating second object-stored metadata for the second object based on the first object-stored metadata; validating the second object-stored metadata using a first hash value that generated based on the first object-stored metadata; and generating for display, on a user interface, a data migration confirmation based on validating the second object-stored metadata using the first hash value, wherein the data migration confirmation indicates that the first object-stored metadata was successfully migrated to the target source.

6. The method of any one of the preceding embodiments, further comprising: generating a third object-stored metadata for the first object, wherein the third object-stored metadata is not included in the first object-stored metadata; including the third object-stored metadata in the first supplemental data structure; and in response to executing the first function, generating a second object at the target location, wherein the second object corresponds to the first object, and wherein the second object comprises the third object-stored metadata.

7. The method of any one of the preceding embodiments, further comprising: comparing fourth object-stored metadata to the third object-stored metadata, wherein the fourth object-stored metadata is generated at the target location in response to migrating the first object; determining an inconsistency between the fourth object-stored metadata and the third object-stored metadata; and modifying the fourth object-stored metadata based on the inconsistency.

8. The method of any one of the preceding embodiments, further comprising: generating a first name of the first object-stored metadata; including the first name in the first supplemental data structure; in response to executing the first function, generating a second object at the target location, wherein the second object corresponds to the first object, and wherein the second object comprises a second name; determining that the first supplemental data structure corresponds to the second object based on comparing the first name to the second name; and in response to determining that the first supplemental data structure corresponds to the second object, populating second object-stored metadata for the second object based on the first supplemental data structure.

9. The method of any one of the preceding embodiments, further comprising: generating a first content type of the first object-stored metadata; including the first content type in the first supplemental data structure; in response to executing the first function, generating a second object at the target location, wherein the second object corresponds to the first object, and wherein the second object comprises a second content type; determining that the first supplemental data structure corresponds to the second object based on comparing the first content type to the second content type; and in response to determining that the first supplemental data structure corresponds to the second object, populating second object-stored metadata for the second object based on the first supplemental data structure.

10. The method of any one of the preceding embodiments, wherein generating the first supplemental data structure further comprises: determining a compatibility requirement of the target location; and formatting the first supplemental data structure based on the compatibility requirement.

11. The method of any one of the preceding embodiments, wherein generating the array of the first object-stored metadata further comprises: inputting the first object-stored metadata into an artificial intelligence model, wherein the artificial intelligence model is trained on object-stored metadata samples to generate arrays of data; and receiving an output from the artificial intelligence model, wherein the array is based on the output.

12. The method of any one of the preceding embodiments, wherein the first object-stored metadata comprises a third object that is linked to the first object.

13. The method of any one of the preceding embodiments, wherein executing the first function further comprises: determining a first application programming interface ("API") for the target location; generating a first API request, using the first API, wherein the first API request communicates the first object from the source location to the target location; and generating a second API request, using the first API, wherein the second API request communicates the first object-stored metadata from the staging location to the target location.

14. The method of any one of the preceding embodiments, further comprising: receiving a notification that the first function is executed; and in response to receiving the notification, executing a second function that causes the first object-stored metadata to be migrated from the staging location to the target location based on the second source identifier.

15. The method of any one of the preceding embodiments, further comprising: receiving, at a user interface, a first user input requesting that the first object be migrated; receiving, at the user interface, a second user input identifying the source location; and receiving, at the user interface, a third user input identifying the target location.

16. The method of any one of the preceding embodiments, further comprising: generating a first entry in a retention log of the staging location, wherein the first entry corresponds to the first object; and generating a second entry in the retention log of the staging location, wherein the second entry corresponds to the first supplemental data structure.

17. A tangible, non-transitory, computer-readable medium storing instructions that, when executed by a data processing apparatus, cause the data processing apparatus to perform operations comprising those of any of embodiments 1-16.

18. A system comprising one or more processors; and memory storing instructions that, when executed by the processors, cause the processors to effectuate operations comprising those of any of embodiments 1-16.

19. A system comprising means for performing any of embodiments 1-16.

I claim:

1. A system for retention of data while migrating metadata, stored in object storage of objects being migrated, across container ecosystems comprising computer storage to preserve the data for artificial intelligence applications, the system comprising:
- one or more processors; and
- one or more non-transitory, computer-readable mediums comprising instructions that when executed by the one or more processors causes operations comprising:
  - receiving, at a user interface, a first user input requesting that a first object, at a source location, be migrated to a target location;
  - determining first object-stored metadata for the first object;
  - generating an array of the first object-stored metadata;
  - generating a first hash value of the first object-stored metadata;
  - determining a first source identifier, wherein the first source identifier corresponds to the first object at the source location;
  - generating a first supplemental data structure comprising the array, the first hash value, and the first source identifier;
  - generating a third object-stored metadata for the first object, wherein the third object-stored metadata is not included in the first object-stored metadata;
  - including the third object-stored metadata in the first supplemental data structure;
  - storing the first supplemental data structure at a staging location;
  - executing a first function that causes the first object to be migrated from the source location to the target location and changes the first source identifier in the first supplemental data structure to a second source identifier, wherein the second source identifier corresponds to the first object at the target location;
  - in response to executing the first function, generating a second object at the target location, wherein the second object corresponds to the first object, and wherein the second object comprises the third object-stored metadata;
  - populating second object-stored metadata for the second object based on the first object-stored metadata;
  - validating the second object-stored metadata using the first hash value; and
  - generating for display, on the user interface, a data migration confirmation based on validating the second object-stored metadata using the first hash value, wherein the data migration confirmation indicates that the first object-stored metadata was successfully migrated to the target location.

2. A method for data retention while migrating metadata stored in object storage of objects being migrated across container ecosystems comprising computer storage, the method comprising:
- receiving a first object, at a source location, for migration to a target location, wherein the source location comprises a first computing device, and wherein the target location comprises a second computing device;
- determining first object-stored metadata for the first object;
- generating an array of the first object-stored metadata;
- determining a first source identifier, wherein the first source identifier corresponds to the first object at the source location;
- generating a first supplemental data structure comprising the array and the first source identifier;
- generating a third object-stored metadata for the first object, wherein the third object-stored metadata is not included in the first object-stored metadata;
- including the third object-stored metadata in the first supplemental data structure;
- storing the first supplemental data structure at a staging location;
- executing a first function that causes the first object to be migrated from the source location to the target location and changes the first source identifier in the first supplemental data structure to a second source identifier, wherein the second source identifier corresponds to the first object at the target location; and
- in response to executing the first function, generating a second object at the target location, wherein the second object corresponds to the first object, and wherein the second object comprises the third object-stored metadata.

3. The method of claim 2, further comprising:
- generating a first hash value of the first object-stored metadata;
- including the first hash value in the first supplemental data structure; and
- validating, using the first hash value, that the first object-stored metadata has been successfully migrated to the target location.

4. The method of claim 2, further comprising:
- receiving a data migration confirmation that the first object and the first object-stored metadata have been successfully migrated to the target location; and
- deleting the first supplemental data structure from the staging location.

5. The method of claim 2, further comprising:
- in response to executing the first function, generating a second object at the target location, wherein the second object corresponds to the first object;
- populating second object-stored metadata for the second object based on the first object-stored metadata;
- validating the second object-stored metadata using a first hash value that generated based on the first object-stored metadata; and
- generating for display, on a user interface, a data migration confirmation based on validating the second object-stored metadata using the first hash value, wherein the data migration confirmation indicates that the first object-stored metadata was successfully migrated to the target location.

6. The method of claim 2, further comprising:
- comparing fourth object-stored metadata to the third object-stored metadata, wherein the fourth object-stored metadata is generated at the target location in response to migrating the first object;
- determining an inconsistency between the fourth object-stored metadata and the third object-stored metadata; and
- modifying the fourth object-stored metadata based on the inconsistency.

7. The method of claim 2, further comprising:
- generating a first name of the first object-stored metadata;
- including the first name in the first supplemental data structure;
- in response to executing the first function, generating a second object at the target location, wherein the second object corresponds to the first object, and wherein the second object comprises a second name;

determining that the first supplemental data structure corresponds to the second object based on comparing the first name to the second name; and in response to determining that the first supplemental data structure corresponds to the second object, populating second object-stored metadata for the second object based on the first supplemental data structure.

8. The method of claim 2, further comprising:
generating a first content type of the first object-stored metadata;
including the first content type in the first supplemental data structure;
in response to executing the first function, generating a second object at the target location, wherein the second object corresponds to the first object, and wherein the second object comprises a second content type;
determining that the first supplemental data structure corresponds to the second object based on comparing the first content type to the second content type; and
in response to determining that the first supplemental data structure corresponds to the second object, populating second object-stored metadata for the second object based on the first supplemental data structure.

9. The method of claim 2, wherein generating the first supplemental data structure further comprises:
determining a compatibility requirement of the target location; and
formatting the first supplemental data structure based on the compatibility requirement.

10. The method of claim 2, wherein generating the array of the first object-stored metadata further comprises:
inputting the first object-stored metadata into an artificial intelligence model, wherein the artificial intelligence model is trained on object-stored metadata samples to generate arrays of data; and
receiving an output from the artificial intelligence model, wherein the array is based on the output.

11. The method of claim 2, wherein the first object-stored metadata comprises a third object that is linked to the first object.

12. The method of claim 2, wherein executing the first function further comprises:
determining a first application programming interface ("API") for the target location;
generating a first API request, using the first API, wherein the first API request communicates the first object from the source location to the target location; and
generating a second API request, using the first API, wherein the second API request communicates the first object-stored metadata from the staging location to the target location.

13. The method of claim 2, further comprising:
receiving a notification that the first function is executed; and
in response to receiving the notification, executing a second function that causes the first object-stored metadata to be migrated from the staging location to the target location based on the second source identifier.

14. The method of claim 2, further comprising:
receiving, at a user interface, a first user input requesting that the first object be migrated;
receiving, at the user interface, a second user input identifying the source location; and
receiving, at the user interface, a third user input identifying the target location.

15. The method of claim 2, further comprising:
generating a first entry in a retention log of the staging location, wherein the first entry corresponds to the first object; and
generating a second entry in the retention log of the staging location, wherein the second entry corresponds to the first supplemental data structure.

16. One or more non-transitory, computer-readable mediums, comprising instructions that, when executed by one or more processors, cause operations comprising:
receiving a first object, at a source location, for migration to a target location;
determining first object-stored metadata for the first object;
generating an array of the first object-stored metadata;
determining a first source identifier, wherein the first source identifier corresponds to the first object at the source location;
generating a first supplemental data structure comprising the array and the first source identifier;
generating a third object-stored metadata for the first object, wherein the third object-stored metadata is not included in the first object-stored metadata;
including the third object-stored metadata in the first supplemental data structure;
storing the first supplemental data structure at a staging location;
executing a first function that causes the first object to be migrated from the source location to the target location and changes the first source identifier in the first supplemental data structure to a second source identifier, wherein the second source identifier corresponds to the first object at the target location; and
in response to executing the first function, generating a second object at the target location, wherein the second object corresponds to the first object, and wherein the second object comprises the third object-stored metadata.

17. The one or more non-transitory, computer-readable mediums of claim 16, wherein the operations further comprise:
generating a first hash value of the first object-stored metadata;
including the first hash value in the first supplemental data structure; and
validating, using the first hash value, that the first object-stored metadata has been successfully migrated to the target location.

18. The one or more non-transitory, computer-readable mediums of claim 16, wherein the operations further comprise:
receiving a data migration confirmation that the first object and the first object-stored metadata have been successfully migrated to the target location; and
deleting the first supplemental data structure from the staging location.

19. The one or more non-transitory, computer-readable mediums of claim 16, wherein the operations further comprise:
in response to executing the first function, generating a second object at the target location, wherein the second object corresponds to the first object;
populating second object-stored metadata for the second object based on the first object-stored metadata;
validating the second object-stored metadata using a first hash value that generated based on the first object-stored metadata; and generating for display, on a user interface, a data migration confirmation based on validating the second object-stored metadata using the first hash value, wherein the data migration confirmation indicates that the first object-stored metadata was successfully migrated to the target location.

* * * * *